July 2, 1957 P. J. H. JANSSEN 2,798,152
DETECTOR FOR EITHER FREQUENCY MODULATION OR AMPLITUDE MODULATION WITH NOISE REDUCTION MEANS
Filed Feb. 5, 1954
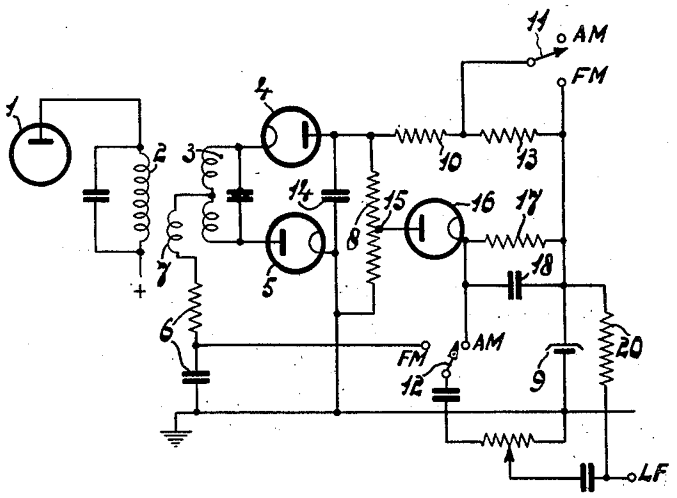
INVENTOR
PETER JOHANNES HUBERTUS JANSSEN
BY Fred M Vogel
AGENT

United States Patent Office 2,798,152

Patented July 2, 1957

2,798,152

DETECTOR FOR EITHER FREQUENCY MODULATION OR AMPLITUDE MODULATION WITH NOISE REDUCTION MEANS

Peter Johannes Hubertus Janssen, Eindhoven, Netherlands, assignor, by mesne assignments, to North American Philips Company, Inc., New York, N. Y., a corporation of Delaware Application February 5, 1954, Serial No. 408,542

Claims priority, application Belgium February 24, 1953

2 Claims. (Cl. 250—20)

This invention relates to FM-AM receiving circuit-arrangements comprising a ratio detector to be operative for FM-reception and which comprises an RC filter suppressing unwanted amplitude modulation of the incoming FM oscillation. The abbreviation "FM" indicates frequency modulation, the abbreviation "AM" amplitude modulation and the abbreviation "RC" resistor-capacitor.

The object of the invention is to make the said circuit arrangement also suitable for limiting interference peaks which may accompany the AM-reception with the use of simple means, that is to say means which require only few additional parts. The invention thus exhibits the characteristic that a tapping on the resistor of the RC-filter is connected by way of the series-combination of a rectifier and a second resistor to the capacitor of the said RC-filter, so that in the case of AM-reception, in which the suppression of amplitude modulation by the RC-filter is made inoperative, the demodulated AM-oscillation produced across the said second resistor is accompanied at the most by limited interference peaks.

In order that the invention may be readily carried into effect, it will now be described with reference to the accompanying drawing, showing, by way of example, one embodiment thereof.

The oscillations produced in the output circuit of an intermediate-frequency amplifying tube 1 of the receiving circuit are supplied to a ratio detector comprising two coupled resonant circuits 2 and 3, two rectifiers 4 and 5, an output filter 6, at which the demodulated FM-oscillation is produced and which is connected to the electrical center of the secondary circuit 3 by way of a coil 7 which is tightly coupled to the primary circuit 2, and an RC-filter which suppresses unwanted amplitude modulation of the incoming FM-oscillation and which comprises a resistor 8 and a capacitor 9, whilst, as is usually the case, a small resistor 10 may be connected in series with the capacitor 9, which resistor when suitably proportioned increases the amplitude modulation-suppression factor.

Thus, in the case of FM-reception, in which switches 11 and 12 make contact with the terminals FM, the demodulated FM-oscillation is supplied by way of the switch 12 to a terminal LF which is connected to a low-frequency amplifier (not shown) of the receiving circuit, the interference produced by unwanted amplitude modulation of the incoming FM-oscillation being suppressed in known manner by coupling of the rectifiers 4, 5 by means of the switch 11 to the capacitor 9 of the RC-filter 8, 9, 10.

In the case of AM-reception, in which the switches 11 and 12 make contact with the terminals AM, the switch 11 connects a resistor 13 having a relatively large value of resistance in series with the capacitor 9, so that the amplitude-modulation suppression by the RC-filter 8, 9, 10 is made inoperative. The demodulated AM-oscillation is thus produced across the resistor 8 which is bridged by a comparatively small capacitor 14.

A demodulated AM-oscillation which is substantially free from unwanted interference peaks which may accompany the incoming AM-oscillation may be obtained across a resistor 17 having a comparatively large value, by connecting a tapping 15 of the resistor 8 by way of a rectifier 16 and the said resistor 17 to the capacitor 9. In order to recognize this, it may be remembered that a voltage is set up across capacitor 9 which is equal to a portion—determined by the ratio of the resistors 13 and 17—of the direct-voltage component of the oscillation set up across resistor 8, which voltage fulfils the function of a threshold voltage for the rectifier 16, so that unwanted interference peaks which occur at point 15 due to clipping of the rectifier 16 are limited to a value corresponding to the said threshold voltage.

A further decrease of the interference peaks may be obtained by connecting a small capacitor 18 in parallel with the resistor 7. In one advantageous embodiment the various circuit elments had the following values:

Resistance of filter 6=47 ohms, capacitor of filter 6=330 μμf., upper part of resistor 8=18K ohms, lower part of resistor 8=10K ohms, capacitor 9=5 μf., resistor 10=1.5K ohms, resistor 13=120K ohms, capacitor 14=330 μμf., resistor 17=120K ohms, and capacitor 18=330 μμf.

The voltage across the capacitor 9 may serve for many kinds of other purposes, for example for automatic volume control or for delayed automatic volume control. It may alternatively provide the negative grid-bias for one of the low-frequency tubes of the receiving circuit-arrangement such as represented, for example, by a resistor 20.

What is claimed is:

1. A circuit-arrangement for selectively receiving frequency-modulated signals and amplitude-modulated signals, comprising a ratio detector having a pair of diodes and having an input circuit connected to an electrode of each said diode, means connected to selectively feed said signals to said input circuit, a first resistor connected between the remaining electrodes of said diodes, a capacitor, means for selectively connecting said capacitor substantially in parallel with said first resistor during the reception of said frequency-modulated signals to form an amplitude-suppressing filter, a tap on said first resistor, and a rectifier and a second resistor connected in series between said tap and a terminal of said capacitor whereby during the reception of said amplitude-modulated signals the demodulated signal appears across said second resistor and unwanted noise peaks are prevented by said rectifier from appearing at said second resistor.

2. A circuit-arrangement as claimed in claim 1, including a second capacitor connected across at least a portion of said first resistor, and in which said means for selectively connecting said first-named capacitor substantially across said first resistor comprises a parallel combination of a third resistor and a short-circuiting switch, said parallel combination being connected in the circuit between an end of said first resistor and said terminal of said first-named capacitor.

References Cited in the file of this patent

UNITED STATES PATENTS

| | | |
|---|---|---|
| 2,250,862 | Farrington | July 29, 1941 |
| 2,341,937 | Maynard | Feb. 15, 1944 |
| 2,351,212 | Houghton | June 13, 1944 |
| 2,413,593 | Sziklai | Dec. 31, 1946 |
| 2,519,890 | Crosby | Aug. 22, 1950 |
| 2,561,088 | Anderson | July 17, 1951 |